United States Patent [19]

Kennon

[11] 4,237,384
[45] Dec. 2, 1980

[54] WIND TURBINE MEANS

[76] Inventor: Woodrow A. Kennon, Rte. 1, Dyersburg, Tenn. 38024

[21] Appl. No.: 52,690

[22] Filed: Jun. 27, 1979

Related U.S. Application Data

[63] Continuation-in-part of Ser. No. 825,435, Aug. 17, 1977, abandoned.

[51] Int. Cl.³ .................................................. F03D 7/00
[52] U.S. Cl. ...................................... 290/55; 290/44; 415/4; 415/151
[58] Field of Search ...................... 290/43, 44, 54, 55; 415/2–4, 151

[56] References Cited

U.S. PATENT DOCUMENTS

| 372,300 | 11/1887 | Chubbuck | 415/4 |
|---|---|---|---|
| 1,460,114 | 6/1923 | Shelton | 415/4 |
| 1,677,745 | 7/1928 | Bonetto | 415/2 |
| 1,812,400 | 6/1931 | Gilley | 415/4 |
| 2,059,356 | 11/1936 | James | 415/2 |
| 3,721,290 | 3/1973 | Butler, Jr. | 290/55 X |
| 4,019,828 | 4/1977 | Bunzer | 290/55 X |

*Primary Examiner*—Gene Z. Rubinson
*Assistant Examiner*—W. E. Duncanson, Jr.

[57] ABSTRACT

A turbine wheel which includes a housing for enclosing the electrical generating apparatus, and track structure which engages and rotatably drives the generator or the like, i.e., through suitable coupling structure. Shroud structure is disposed in an operable exterior proximity with the turbine wheel for varying the effectiveness of the wind as it is acting upon the turbine wheel, i.e., in infinite variable stages commensurate with changing velocity of the wind. The speed of the turbine wheel is automatically controlled so as to remain substantially constant throughout a wide variance of normal wind velocity and irrespective of the direction of the wind.

20 Claims, 27 Drawing Figures

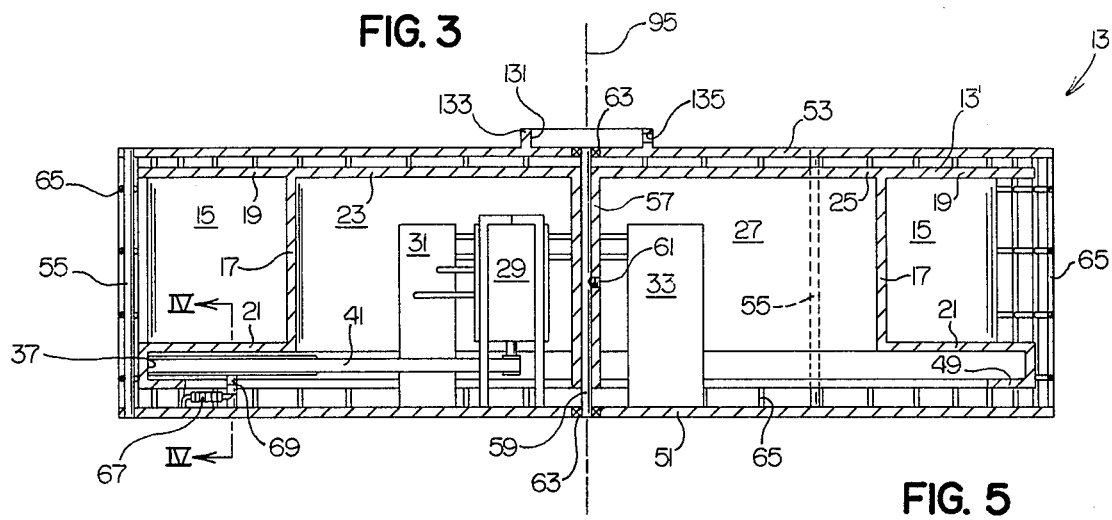
FIG. 3
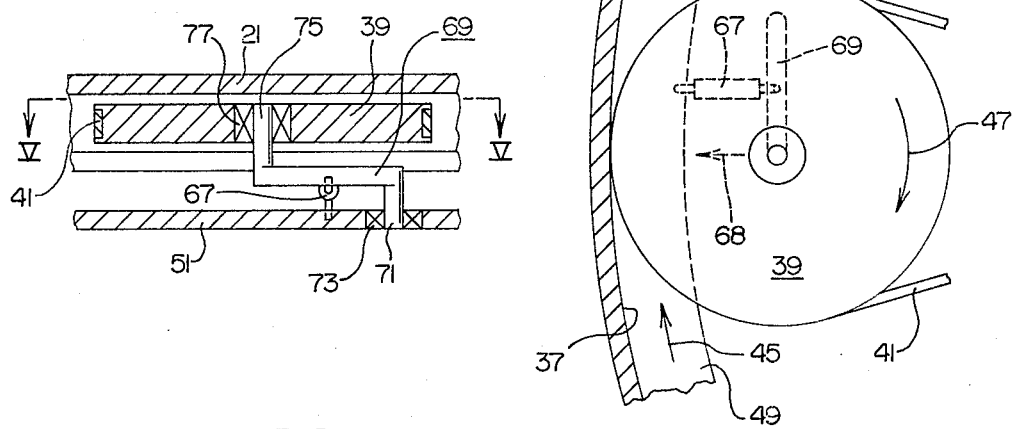
FIG. 4
FIG. 5
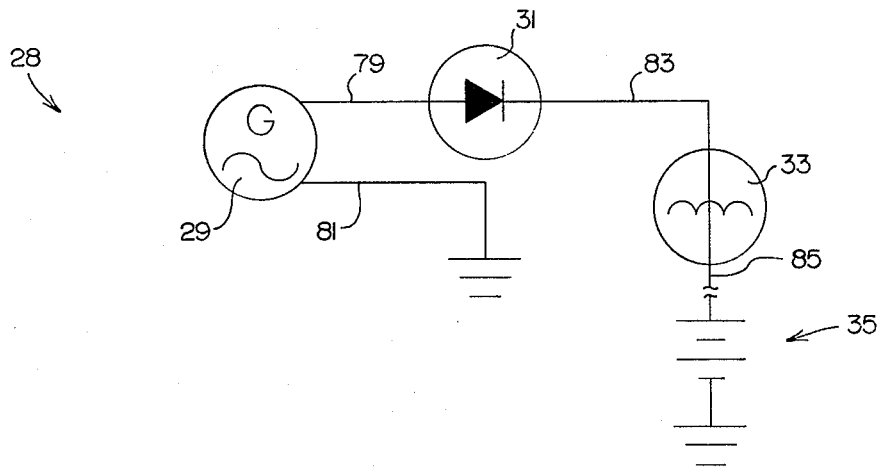
FIG. 6

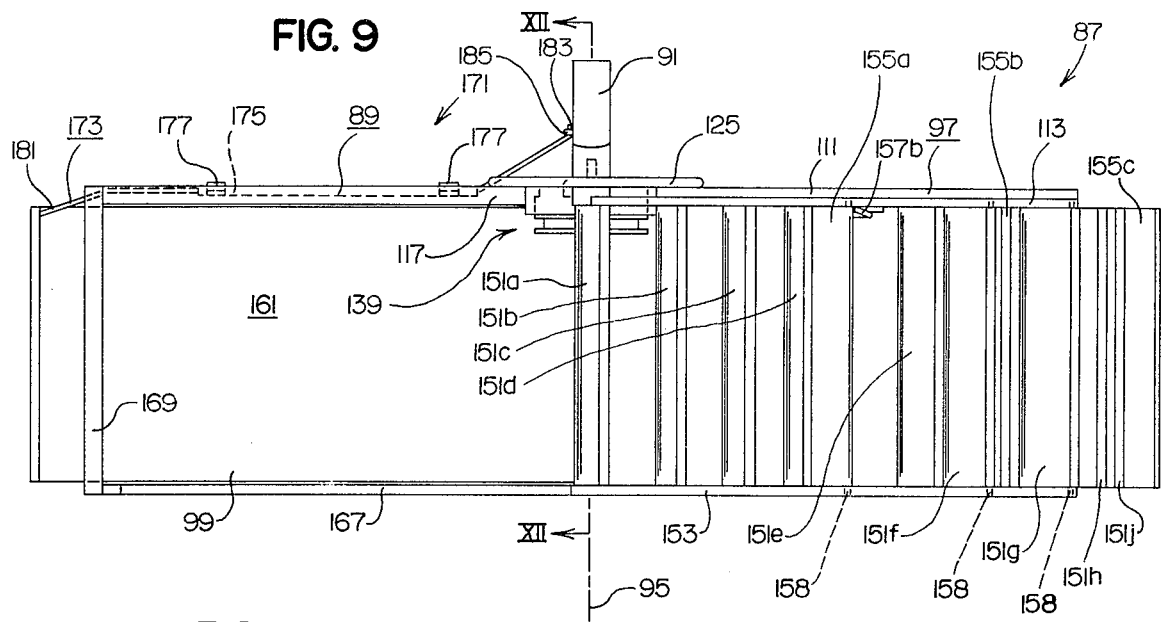
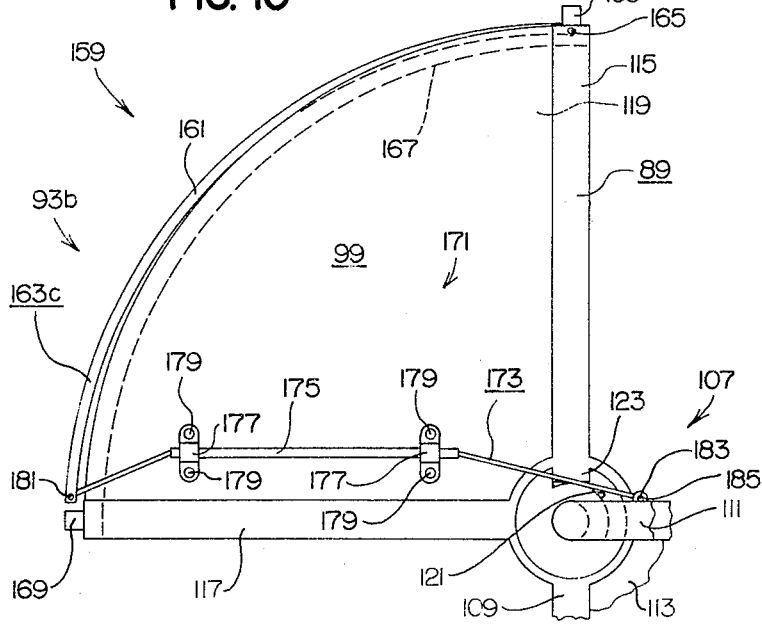
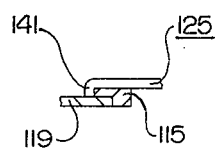
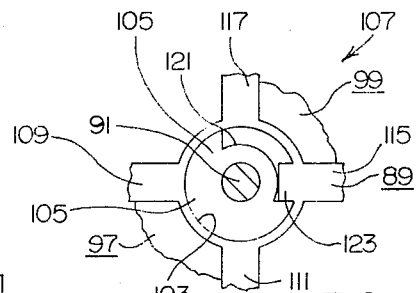
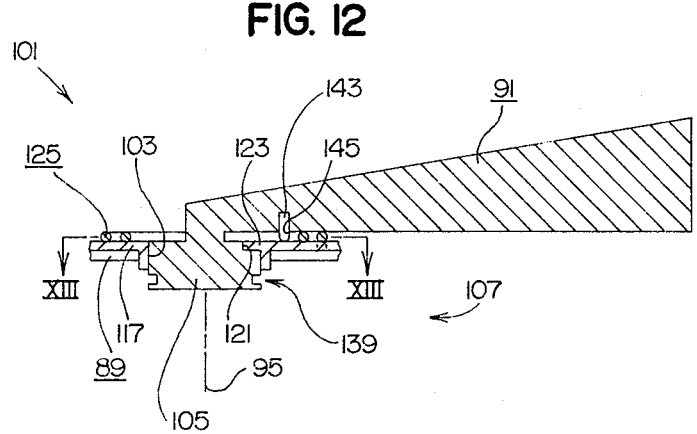
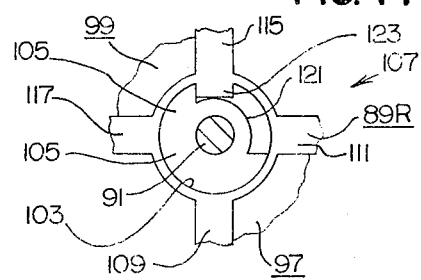

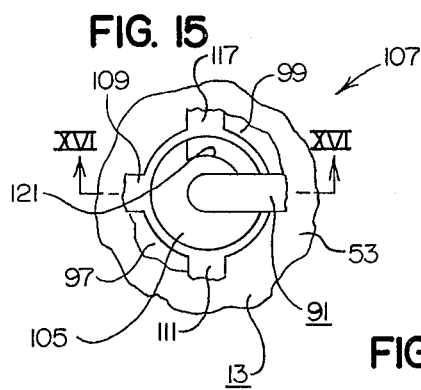
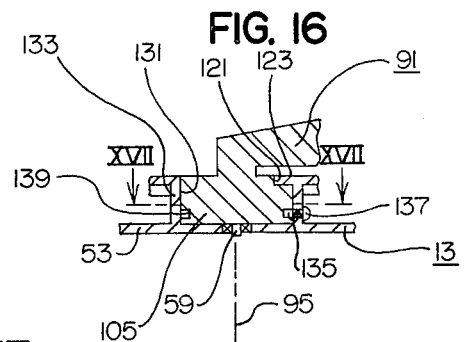
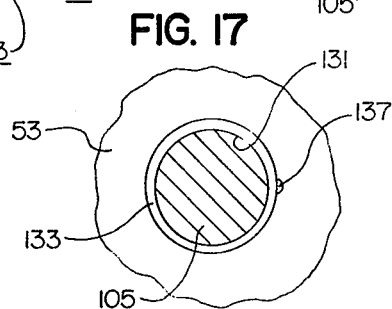
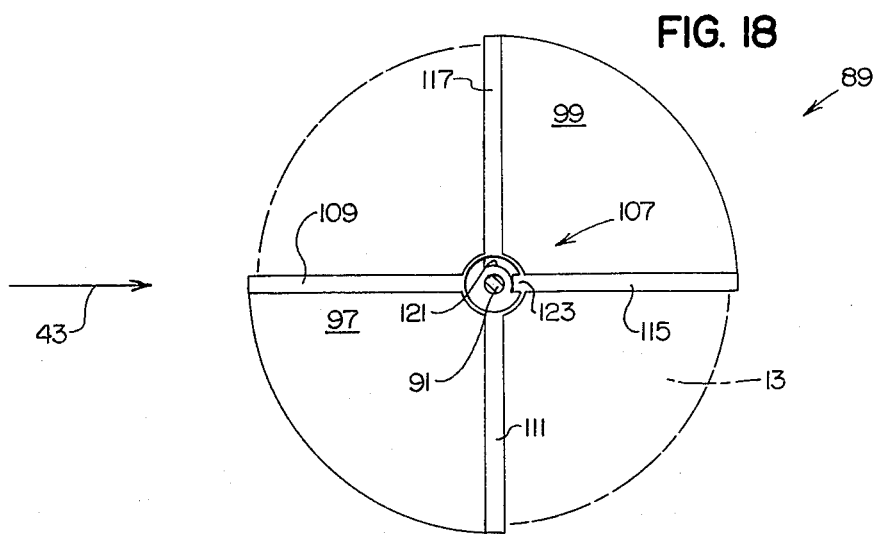
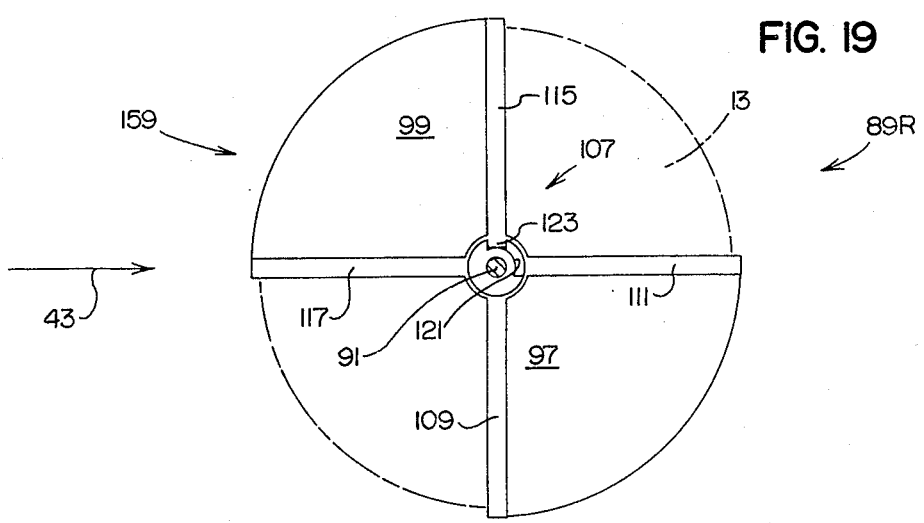

WIND TURBINE MEANS

CROSS REFERENCE TO RELATED APPLICATION

This is a continuation-in-part of my application, Ser. No. 825,435, filed Aug. 17, 1977, now abandoned and entitled "Wind Turbine Means."

BACKGROUND OF THE INVENTION

1. Field of the Invention

This invention relates to the field of wind-driven turbines.

2. Description of the Prior Art

With the ever increasing demand for energy and the inevitability of man eventually consuming all of the fossil fuel, i.e., particularly petroleum, science is obviously searching for substitutes for petroleum-consuming machinery. Therefore, electricity is being considered for eventually powering machinery that heretofore was deemed unfeasible. Accordingly, various means for generating electrical energy are presently being explored, among these are various wind-powered apparatuses toward which the present invention is addressed. Numerous and varied configured wind turbines have heretofore been conceived and developed. In fact, applicant is aware of the following U.S. patents pertaining to such various apparatuses: U.S. Pat. No. 1,463,924 to Ozaki; U.S. Pat. Nos. 1,523,295 and 1,574,171 to Ryan; U.S. Pat. No. 1,974,008 to Biehn; U.S. Pat. No. 2,059,356 to James; and U.S. Pat. No. 2,169,149 to Johanson. None of the above patents suggest or disclose applicant's apparatus. Applicant is also aware of the following U.S. patents which were cited by the Examiner in the prosecution of the above cross-referenced application: U.S. Pat. No. 372,300 to Chubbuck; U.S. Pat. No. 1,460,114 to Shelton; U.S. Pat. No. 1,677,745 to Bonetto; U.S. Pat. No. 1,812,400 to Gilley; U.S. Pat. No. 2,059,356 to James; U.S. Pat. No. 3,721,290 to Butler; and U.S. Pat. No. 4,019,828 to Bunzer. None of the above patents disclose or suggest the present invention.

SUMMARY OF THE INVENTION

The present invention is directed towards overcoming the disadvantages and problems relative to previous wind turbines. The concept of the present invention is to provide a wind turbine means which includes a turbine wheel means and a shroud means for partially covering the turbine wheel means to vary the effect of changing wind conditions on the turbine wheel means. For example, the present invention may provide a turbine wheel which includes a housing for enclosing the electrical generating apparatus, and track structure which engages and rotatably drives the electrical generating apparatus, e.g., a generator or the like through suitable coupling structure. Shroud structure is disposed in operable exterior proximity with the turbine wheel for varying the effectiveness of the wind as it is acting upon the turbine wheel, i.e., in infinite variable stages commensurate with the changing velocity of the wind. The speed of the turbine wheel is automatically controlled so as to remain substantially constant throughout a wide variance of natural wind velocity and irrespective of the direction of the wind.

More specifically the shroud structure or deflector apparatus thereof, includes integrally attached primary and secondary quadrant members diagonally disposed one from the other and converging at the vertical axis of the turbine wheel. The deflector has a normal position which corresponds to minimal wind velocity conditions, a retard position which corresponds to strong wind velocity conditions, and infinite variable positions therebetween. The primary quadrant member includes primary baffler means for precluding direct impingement of the wind with the convex surfaces of the individual vanes of the turbine wheel which occupy the forward facing semicircle of the turbine wheel when the deflector is in the normal position. The secondary quadrant member includes an air scoop for scooping and directing the wind inwardly toward a portion of the rearward semicircle of the turbine wheel when the deflector is in the normal position. Thus, the air scoop causes the wind to advantageously impinge the concave surfaces of those individual vanes which occupy at least a portion of the rearward semicircle of the turbine wheel, i.e., when the wind velocity is minimal.

The device also includes control structure for sensing changes in the wind velocity and effectively controlling the position of the deflector which is operatively responsive to the control structure, i.e., in moving to the various positions alluded to above so as to have varying degrees of effect in controlling the speed of the turbine wheel.

It is anticipated that the wind turbine of the present invention will be used for infinite purposes, i.e., anywhere that it might be desirable to generate electrical energy. However, the present invention is anticipated as being especially adaptable to various vehicles both fast-moving vehicles, e.g., trains, trucks, buses, etc., as well as slow-moving vehicles, e.g., farm tractors, riding lawnmowers, boats, barges, houseboats, etc. Also, the present invention may be used on stationary structures, e.g., residential dwellings including mobile homes, outdoor advertising signs, street lights, etc. Additionally, many long roofed vehicles could use a plurality of the wind turbines of the present invention, i.e., station wagons, trailer trucks, buses, house trailers, motor homes, mobile homes, trains, etc.

The turbine wheel and the shroud would be used together as a unit on stationary structures and slow-moving vehicles, i.e., tractors, boats, barges, etc. However, on fast-moving vehicles, i.e., automobiles, trucks, trains, etc., the shroud preferably would be removed from the device when traveling. In other words, the advantages of the shroud are particularly significant during natural wind conditions. However, the shroud could most certainly be used to an advantage with these fast-moving vehicles when parked for any length of time.

DESCRIPTION OF THE DRAWINGS

FIG. 3 is a sectional view taken as on the line III—III of FIG. 2.

FIG. 4 is a sectional view taken as on the line IV—IV of FIG. 3.

FIG. 5 is a sectional view taken as on the line V—V of FIG. 4 with the view having been rotated 90°.

FIG. 6 is a simple schematic showing the electrical arrangement of the first embodiment of the present invention.

FIG. 9 is an end view of the structure depicted in FIG. 7 with the view being taken as on the line IX—IX thereof.

FIG. 10 is a duplication of the secondary quadrant as shown in FIG. 8 with the purpose of this figure being to depict the displacement of certain structure thereof.

FIG. 11 is a sectional view taken as on the line XI—XI of FIG. 7 with certain structure being deleted therefrom.

FIG. 12 is a sectional view taken as on the line XII—XII of FIG. 9 with certain structure being deleted therefrom.

FIG. 13 is a sectional view taken as on line XIII—XIII of FIG. 12 with certain structure being shown in a normal position.

FIG. 14 is a view similar to FIG. 13 but showing the structure alluded to in a retard position.

FIG. 15 is a view similar to FIG. 13 with the view being taken looking down on FIG. 12 and certain structure being deleted therefrom.

FIG. 16 is a sectional view taken as on the line XVI—XVI of FIG. 15 with certain structure being deleted therefrom.

FIG. 17 is a sectional view taken as on the line XVII—XVII of FIG. 16 with certain structure being deleted therefrom.

FIG. 18 diagrammatically depicts the primary and secondary quadrants (or deflector) of the first embodiment of the present invention in proper relationship with the turbine wheel and shown in the normal position with certain structure being deleted, and the wind direction being characterized by an arrow.

FIG. 19 is a view similar to FIG. 18 with the deflector being shown in its retard position.

DESCRIPTION OF THE PREFERRED EMBODIMENTS

Figure 1:
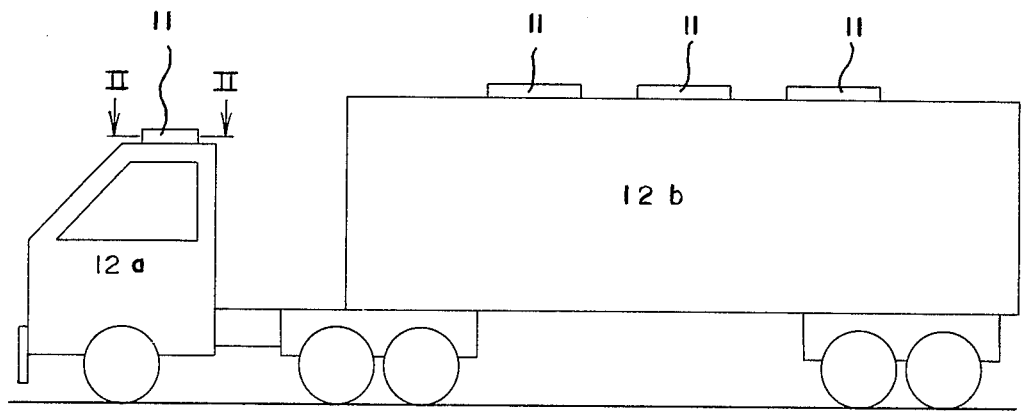
FIG. 1 is a side elevational view of a typical semi-truck and trailer shown with one of a first embodiment of the wind turbines of the present invention being installed on the roof structure of the tractor section and the shroud being removed therefrom with several of the first embodiments of the wind turbines of the present invention being shown installed on the roof structure of the trailer section.
Figure 2:
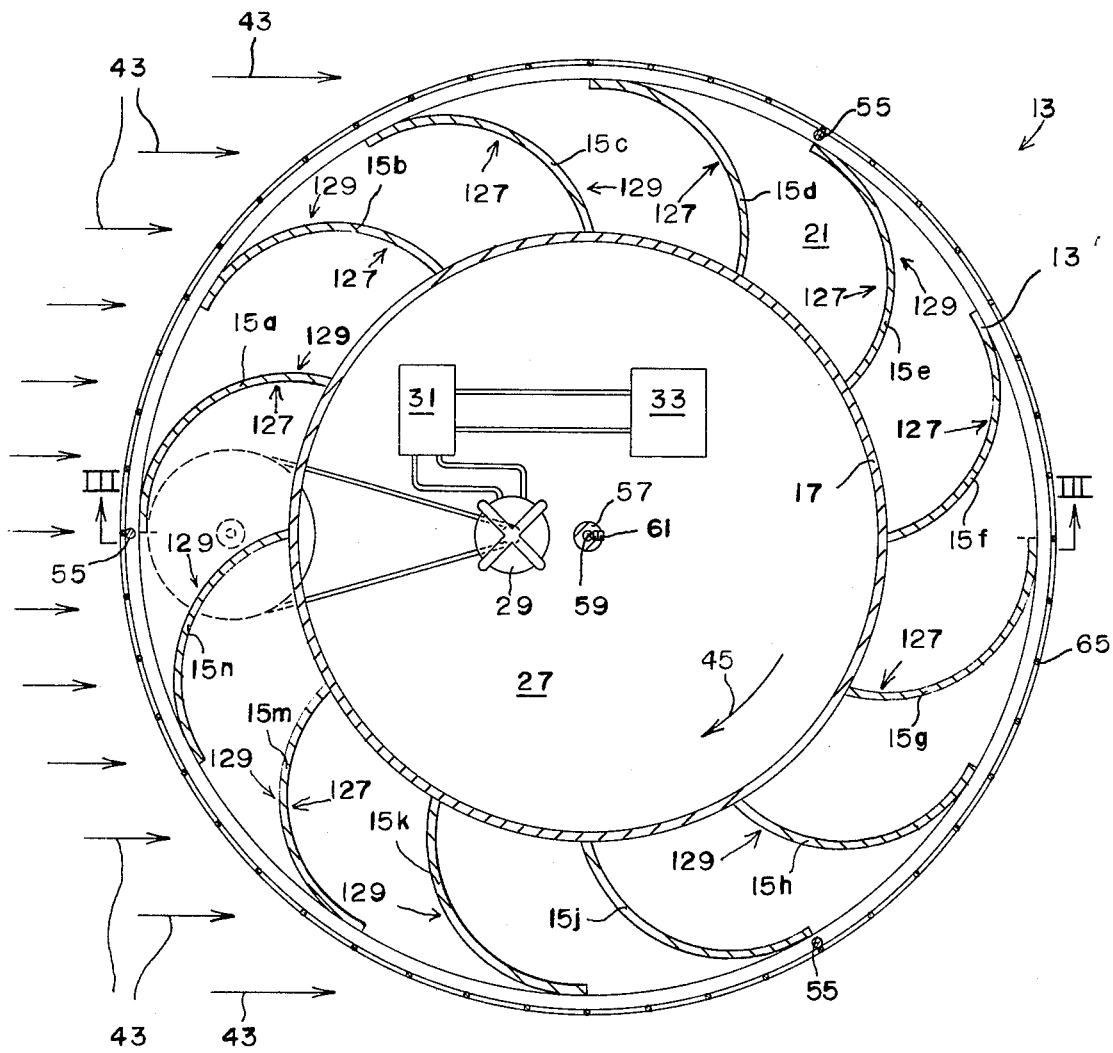
FIG. 2 is a sectional view taken as on the line II—II of FIG. 1 with the wind direction being shown by a plurality of arrows.

A first embodiment of the wind turbine means of the present invention is shown in FIGS. 1–19 of the drawings and identified by the numeral 11. The wind turbine means 11 of the present invention is shown in FIGS. 1 and 2 of the drawings in a somewhat rudimentary or partially developed condition in which it is, nonetheless, intended to be powered by the wind for generating electrical energy. FIG. 1 shows one of the wind turbine means 11 suitably configured to the roof structure of the tractor section 12a of the semi-truck trailer unit and several of the wind turbine means 11 suitably configured to the roof structure of the trailer section 12b all of which may individually be utilized in different configurations which will be fully disclosed as the specification proceeds.

In FIG. 2 of the drawings it may clearly be seen that the wind turbine means 11 generally comprises wind rotatable turbine wheel means 13 having a turbine 13' with numerous vanes 15, which may individually be designated as 15a, 15b, 15c, etc., defining at least in part the periphery thereof. Each of the vanes terminates inwardly at a concentrically disposed circular wall 17. From FIG. 3 of the drawings it may be seen that the upper and lower ends of the vanes 15 terminate at respective upper and lower flange members 19, 21.

Additionally, a closure disc 23 is included as part of the turbine wheel means 13 and as shown in FIG. 3, the perimeter margin thereof, as at 25, is fixedly joined to the top of the circular wall 17. The interior of the disc 23 and the circular wall 17 jointly establishes in part a circular enclosure, as at 27, for housing certain electrical apparatus. The electrical apparatus at least includes electric means, as at 28, and as clearly shown in FIG. 6 of the drawings, for converting mechanical energy to electrical energy, i.e., an alternator 29 or the like suitably coupled to rectifier means 31 and voltage regulator means 33. It should be understood that the electric means 28 is intended to charge storage battery means 35 which in all probability will be located remotely from the wind turbine means 11, i.e., it is not intended that the storage battery means 35 be physically located within the enclosure 27.

More specifically, the storage battery means 35 may simply be the conventional battery used in any vehicle for starting the engine, etc., or it may take on much more elaborate meaning. For example, the storage battery means 35 may constitute a rather large bank of batteries conveniently located on the trailer section 12b for perhaps powering an integral refrigeration unit. Thus, perishables stored within the trailer 12b may be provided with proper temperature control or cold storage even while the trailer 12b may be disconnected from the tractor section 12a. The storage battery means 35 will constantly be charged by the electric means 28 as the wind is blowing. It should be understood that the present invention is not intended to be limited to specifying the particular work the storage battery means 35 may accomplish since it is anticipated that the present invention may be employed in infinite situations or anywhere that the generation of electrical energy may be desirable.

The turbine 13' also includes a concentric circular track member 37, as best viewed in FIGS. 3 through 5 of the drawings, disposed subjacent the vanes 15 for rotation therewith. The wind turbine wheel means 13 also includes sheave means 39 disposed within the circular enclosure 27 and having means, e.g., endless belt means 41 or the like, for operative engagement with the circular track member 37. The sheave means 39 is coupled to the electric means 28 whereby electrical energy is generated as the wind rotatably drives the turbine 13′ while the sheave means 39 is being rotatably driven by the circular track member 37. In FIG. 2 et al of the drawings the direction of the wind is intended to be illustrated by a plurality of arrows 43. Also, the direction of rotation of the turbine 13′ is indicated by an arrow 45. Further, the direction of rotation of the sheave means 39 is indicated in FIG. 5 of the drawings by an arrow 47.

From FIG. 3 of the drawings it may be seen that the track member 37 is integrally attached to the lower flange member 21 while the lower portion of the track member 37 includes an inwardly directed flange member 49.

The wind turbine wheel means 13 also includes frame means constituting a plate-like member or floor 51 for the circular enclosure 27 and an upper plate-like member 53 establishing a roof-like arrangement for the turbine 13′. The plate-like members 51, 53 are rigidly maintained in their spaced-apart distance by a plurality of vertical support members 55.

The turbine 13′ includes a hub 57 which is fixedly attached to a rotatable shaft 59 by a set screw 61 or the like. The shaft 59 is journaled to the plate-like members 51, 53 in a suitable manner as by bearings 63 or the like.

Additionally, the vanes 15 preferably are protected from being damaged by birds or other objects by providing suitable guard structure, e.g., hardward fabric 65 or the like, thereabout.

The sheave means 39 frictionally engages the track member 37 and is yieldably urged toward the track member 37 by helical compression spring means 67 or the like. The sheave means 39 is swingably mounted to the plate-like member 51 by incorporating a crank member 69. A lower arm 71 of crank member 69 is suitably journaled to the plate-like member 51, as by bearing 73, and the sheave means 39 is suitably journaled to an upper arm 75 of crank member 69, as with a bearing 77 or the like. Therefore, since the spring 67 is arranged, as shown in FIG. 5, to pull the upper arm 75 toward the track member 37 (in the direction of the arrow 68), the sheave means 39 is yieldably urged toward the track member 37 for frictional engagement therewith. Preferably, the thickness of the endless belt 41 is such that the belt 41 extends beyond the periphery of the sheave means 39 for engagement with the track member 37. Although the track member 37 may, if desired, include internal gear teeth which meshingly engage external teeth on the sheave means 39, thus negating the belt 41.

Particular attention is now directed toward FIG. 6 of the drawings where it may be seen that the alternator 29 is coupled to the rectifier means 31 through a conductor 79 with the alternator 29 being suitably grounded through a conductor 81. Additionally, a conductor 83 couples the rectifier means 31 with the voltage regulator means 33 which in turn is suitably coupled to the storage battery means 35 as indicated by a conductor 85.

Figure 7:
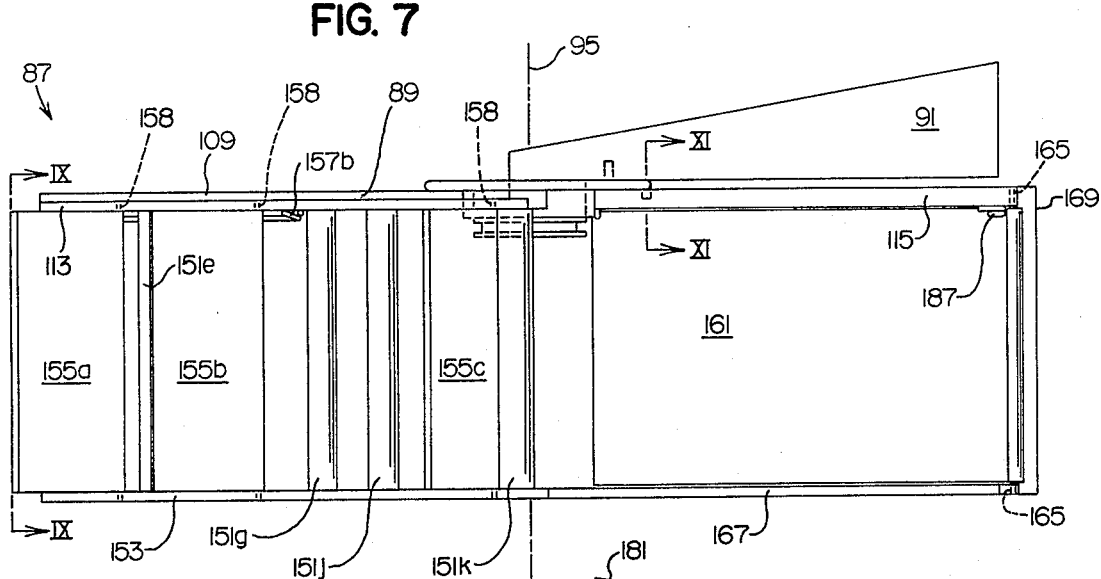
FIG. 7 is a side elevational view of the shroud apparatus of the first embodiment of the present invention as it would appear when removed from the turbine wheel.
Figure 8:
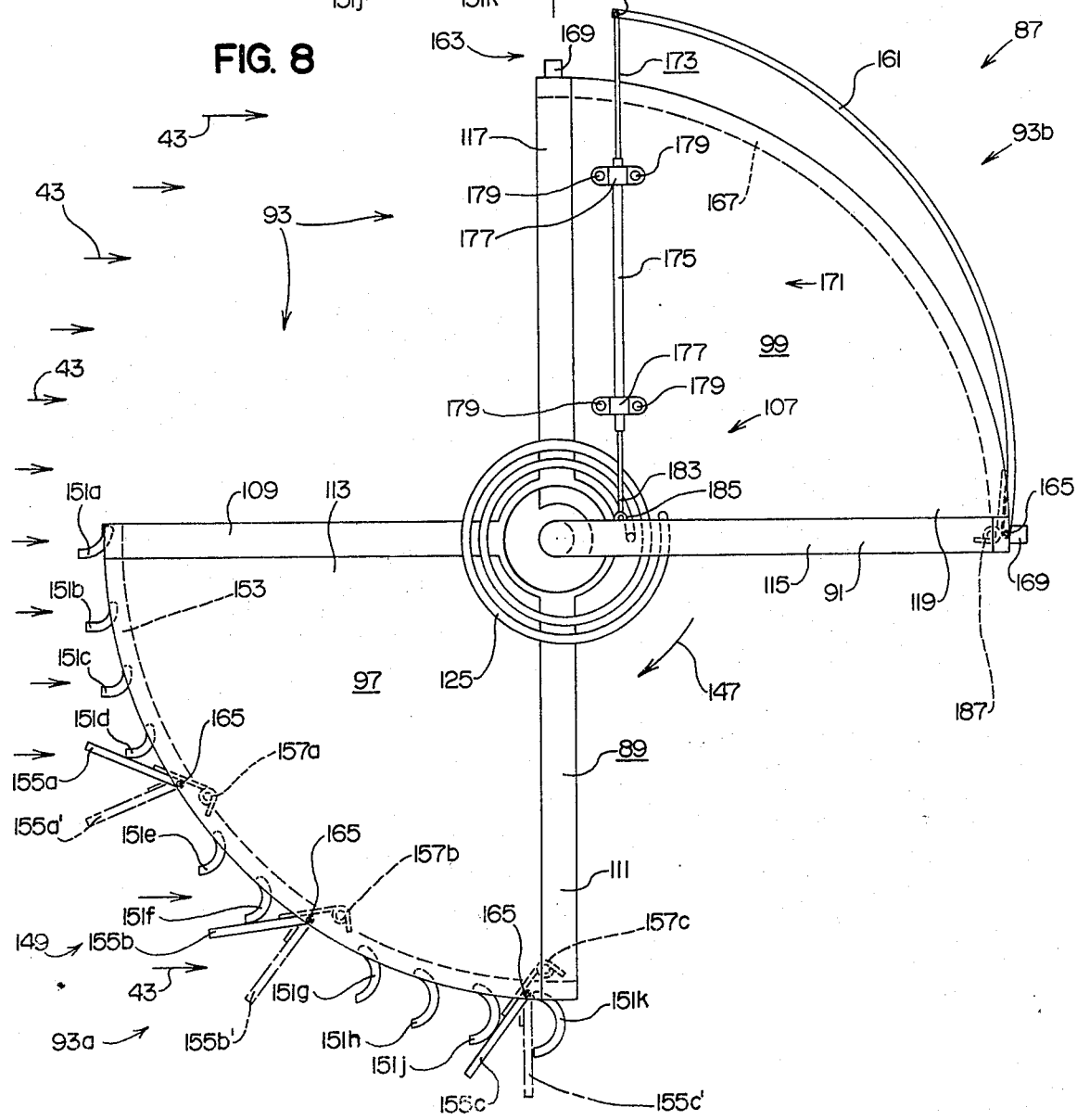
FIG. 8 is a top plan view of the structure depicted in FIG. 7 and which clearly shows integrally attached primary and secondary quadrant members with the wind acting thereon which is characterized by a plurality of arrows.

From FIGS. 7–9 of the drawings it may be seen that the wind turbine means 11 of the present invention preferably includes shroud means 87. It should be understood that the shroud means 87 as shown in FIGS. 7–19 has been removed from the turbine wheel means 13 so as to more clearly depict the structure peculiar thereto. However, the shroud means 87 is intended to be disposed in operable proximity with selectable ones of the vanes 15, i.e., the shroud means 87 simply fits down over the upper plate-like member 53 with certain structure thereof depending downwardly in a confronting arrangement with certain of the vanes 15 in a manner to be fully disclosed as the specification proceeds. The shroud means 87 may optionally be utilized for automatically varying the effectiveness of the wind as it is acting upon the turbine wheel 13. The effectiveness of the shroud means 87 is in infinite variable stages commensurate with the changing velocity of the wind whereby the revolutions per minute of the turbine 13′ remains substantially constant throughout a wide variance of wind velocity. However, as mentioned previously, the shroud means 87 is intended to be removed from the turbine wheel means 13 during high speed traveling conditions.

The shroud means 87 generally includes deflector means 89 for advantageously directing moving air selectively to effectively increase and decrease the speed of rotation of the turbine 13′ commensurate with natural changing velocities of the wind. In addition, tail fin means 91 is included for establishing and substantially constantly maintaining an azimuthal datum-plane which is in agreement with the direction of the wind and is effective irrespective of the velocity thereof. Further, control means, generally characterized by the numeral 93, are included for sensing normal changes in the wind velocity and effectively controlling the speed of the turbine 13′, all of which will be more fully disclosed as the specification proceeds. It should be understood that the turbine 13′ and the shroud means 87 are independently free to rotate 360° about their coextending vertical axes characterized by the numeral 95.

From FIG. 8 of the drawings it may clearly be seen that the deflector means 89 alluded to above includes integrally attached primary and secondary quadrant members 97, 99 diagonally disposed one from the other. Additionally, the control means 93 alluded to above includes a principal system 93a for controlling certain structure peculiar to the primary quadrant member 97 and yet to be disclosed, and a secondary system 93b for controlling certain structure peculiar to the secondary quadrant member 99, also yet to be disclosed.

From FIG. 12 of the drawings it may clearly be seen that the wind turbine means 11 also includes means, e.g., pivot means 101, for pivotally joining the deflector means 89 and the tail fin means 91 one to the other and for individual pivotal movement about their coextending vertical axes 95. More specifically, the deflector means 89 is provided with a socket 103, while the tail fin means 91 includes an umbonated member 105 which is pivotally received within the socket 103, i.e., the umbonated member 105 preferably is integrally formed with the tail fin means 91 or at least they move in unison.

From FIGS. 13–19 of the drawings it may clearly be seen that the wind turbine means 11 also includes limit means, as at 107, for establishing limits to the relative pivotal movement of the deflector means 89 and the tail fin means 91. More specifically, the primary quadrant member 97 includes a pair of main support arms 109, 111 which suitably support a web or plate-like member 113. Similarly, the secondary quadrant member 99 includes a pair of main support arms 115, 117 which suitably support a web or plate-like member 119.

The limit means 107 includes providing the umbonated member 105 with an arcuate groove, as at 121 in FIGS. 13-15, for receiving a protuberance 123 or inwardly directed extension of the arm 115, i.e., the other three arms 109, 111, 117 terminate inwardly at the socket 103 while the protuberance 123 extends into the socket and is received in the arcuate groove 121. The length of the groove 121 is calculated so as to enable the limit means 107 to be effective in limiting the relative movement of the deflector means 89 and the tail fin means 91 to substantially 90°.

From FIG. 8 et al of the drawings it may clearly be seen that the control means 93 also includes at least principal bias means, as at 125, for yieldably biasing the deflector means 89 and the tail fin means 91 one to the other. The principal bias means 125 must be overpowered in achieving relative movement of the deflector means 89 and the tail fin means 91.

Before proceeding with the remaining disclosure of the shroud means 87 it will be advantageous to digress and briefly examine more carefully certain features of the wheel means 13. More specifically, the numerous vanes 15 individually have concave and convex surfaces 127, 129 respectively and are disposed in a uniform array to rotatably drive the turbine wheel 13 in a forward direction, as indicated by the arrow 45 in FIG. 2, as the wind impinges the concave surfaces 127 and to tend to drive the turbine wheel 13 in a reverse direction as the wind impinges the convex surfaces 129, i.e., all of which is well known to those skilled in the art. When the wind turbine means 11 is used on a fast-moving vehicle, e.g., the tractor unit 12a and the like, the shroud means 87 would serve no particular advantage. However, when used on a slow-moving or a stationary vehicle, e.g., a barge or trailer 12b or the like, it is intended the shroud means 87 be attached to the wheel means 13.

FIGS. 3 and 16 of the drawings clearly show the upper plate-like member 53 being provided with an upwardly directed socket 131 which is defined by a circular wall 133 having a transversal threaded aperture 135 provided therein for threadedly receiving a lock bolt 137 or the like therein. FIGS. 12 and 16 show that the umbonated member 105 is provided with an annular groove 139 which is adapted for alignment with the threaded aperture 135. The umbonated member 105 is pivotally received in the socket 131 while the lock bolt 137 extends into the annular groove 139, thus locking the shroud means 87 with the turbine wheel means 13, i.e., as stated above, the turbine 13' and the shroud means 87 are independently free to rotate 360° about their axes 95. Thus, the lock bolt 137 merely prevents lifting the shroud means 87 from the socket 131.

From FIG. 11 of the drawings it may clearly be seen that an outer end 141 of the principal bias means or torsion spring 125 engages the main support arm 115. FIG. 12 shows an inner end 143 of the spring 125 engaging the tail fin means 91. The tail fin means 91 is provided with a bore 145 for receiving the inner end 143. Accordingly, when viewing the deflector means 89 from above, as shown in FIG. 8 of the drawings, the principal bias means or torsion spring 125 urges the deflector means 89 clockwise (or in the direction of an arrow 147) with respect to the tail fin means 91. In other words, the principal bias means or torsion spring 125 must be overpowered in achieving counterclockwise movement of the deflector means 89 with respect to the tail fin means 91.

From the above disclosure it should now be readily understood that the deflector means 89 has a normal position as shown in FIGS. 8, 13, 15, and 18 of the drawings. The normal position of the deflector means 89 corresponds to minimal wind velocity conditions. The deflector means 89 also includes a retard position characterized by the numeral 89 having the letter R suffix position as best shown in FIGS. 14 and 19 of the drawings and which corresponds to strong wind velocity conditions. It should now be apparent that the deflector means 89 also includes infinite variable positions between the normal position and the retard position, i.e., depending upon the length of the arcuate groove 121 which as above disclosed preferably permits 90° relative movement of the deflector means 89 and the tail fin means 91.

From FIGS. 2 and 7-10 of the drawings it may be seen that the primary quadrant member 97 includes primary baffler means 149 for precluding direct impingement of the wind with the convex surfaces 129 of those individual vanes, e.g., the vanes 15k, 15m, 15n (shown in FIG. 2) or those vanes which occupy the forward facing semicircle of the turbine 13' and when the deflector means 89 is in the normal position as shown in FIG. 8, i.e., FIG. 8 should mentally be superimposed over FIG. 2 in order to visualize the actual prevailing conditions.

From FIG. 8 of the drawings it may clearly be seen that the primary baffler means 149 includes a plurality of mini-baffle plates 151, which may individually be designated as 151a, 151b, 151c, etc. Each of the mini-baffle plates 151 have a predetermined arcuate shape and degree of pitch. The mini-baffle plates 151 are arranged for progressively changing the direction of the wind whereby the wind impinges, either directly or indirectly, the concave surfaces 127 of all those individual vanes (15a, 15b, 15c, 15k, 15m, 15n) or those vanes which occupy the forward facing semicircle of the turbine 13' when the deflector means 89 is in the normal position.

The respective upper ends of the plurality of mini-baffle plates 151 are fixedly attached to the arcuate marginal portion of the pie-shaped web 113 in any well-known manner as by welding or the like. The primary baffle means 149 also includes an arcuate formed reinforcement member 153 for supporting the lower ends of the plurality of many baffle plates 151, i.e., the respective lower ends of the plurality of mini-baffle plates 151 are fixedly attached to the reinforcement member 153 in any well-known manner as by welding or the like.

The control means 93, or more specifically the principal system 93a thereof, in addition to the previously mentioned principal bias means or torsion spring 125, includes a plurality of progressively operable wind-flap elements 155 which may individually be designated as 155a, 155b, 155c, etc., as clearly shown in FIGS. 7-9 of the drawings. The wind-flap elements 155 are pivotally attached, as with a plurality of pivot pins 158, to the primary quadrant member 97 for pivotal movement about their respective vertical axes with the wind-flap elements 155 having independently operable retracted and extended positions. More specifically, the wind-flap elements 155 are shown in solid lines in FIG. 8 in their retracted positions and in which they are simply characterized by the numerals 155 having the appropriate letter suffix. Additionally, the wind-flap elements 155 are shown in FIG. 8 in broken lines in their respective extended positions in which they are characterized by a numeral 155 and the appropriate letter suffix and also being further characterized by prime suffixes.

The principal system 93a also includes a plurality of mini-bias elements 157 which are respectively attached to the plurality of wind-flap elements 155 as best shown in FIG. 8 of the drawings for yieldably biasing the wind-flap elements 155 toward the respective retracted positions thereof (as shown in solid lines). The wind-flap elements 155 are progressively moved to their respective extended positions (as shown in broken lines) as the velocity of the wind increases. The extended wind-flap elements thusly, are effective in reacting with the increasing wind velocity to overpower the principal bias means or torsion spring 125 as the deflector means 89 gradually moves toward the retard position 89R as best shown in FIGS. 14 and 19 of the drawings.

The secondary quadrant member 99 includes secondary baffle means 159 for shielding at least a portion of the concave surfaces 127 of the vanes 15a, 15b, 15c or stated another way, for shielding the concave surface 127 of those individual vanes which occupy the forward facing semicircle of the turbine 13' when the deflector means 89 is moved toward the retard position 89R as clearly shown in FIGS. 14, 19 of the drawings.

It should be understood that the just-mentioned secondary baffle means 159 may incorporate several embodiments, e.g., it might simply be established by a vertically arranged arcuate formed plate-like member 161 which depends downwardly from adjacent the pie-shaped web or plate-like member 119. However, the secondary baffle means 159 preferably incorporates air-scoop means as best shown in FIG. 8 of the drawings and characterized therein by the numeral 163.

The air scoop means 163 includes the vertically disposed arcuate plate-like member 161 alluded to above. The air-scoop means 163 scoops and directs the rushing wind inwardly toward a portion of the rearward semicircle of the turbine 13' when the deflector means 89 is in the normal position thus causing the wind to advantageously impinge the concave surfaces 127 of the vanes 15d, 15e and 15f. Stated another way, the air-scoop means 163 directs the wind toward the concave surfaces 127 of those individual vanes which occupy at least a portion of the rearward semicircle of the turbine 13', i.e., here again it should be understood that FIG. 8 is intended to be superimposed over FIG. 2 in order to fully understand the function of the air scoop means 163.

The air scoop 163 may, if desired, be fixed in an optimum position for scooping in the wind toward the vanes 15d, 15e, 15f when the deflector means 89 is in the normal position. However, the air scoop means 163 preferably includes air-scoop pivot means 165 for pivotally attaching the arcuate plate-like member 161 to the shroud means 87. Therefore, the air scoop means 163 preferably is pivotally movable between an open position shown by the numeral 163 in FIG. 8 and a closed position shown by the numeral 163 having the letter C suffix in FIG. 10 of the drawings, and having infinite variable positions therebetween.

The shroud means 87 preferably includes a horizontally disposed arcuate formed support member 167 (FIG. 8) which is rigidly joined to the outer ends of the main support arms 115, 117 by incorporating a pair of vertically disposed support members 169, i.e., the vertical support members 169 are interposed between the main support arms 115, 117 and the arcuate formed support member 167 and are fixedly attached thereto as by welding or the like.

The control means 93, as previously mentioned, includes a secondary system 93b for simultaneously controlling the pivotal movement of the air scoop means 163 between the just mentioned open and closed positions as the deflector means 89 is caused to move between the normal and retard positions 89, 89R in the manner as previously described.

From FIGS. 8–10 of the drawings it may clearly be seen that the secondary system 93b includes mechanical linkage, generally as at 171, for interconnecting the tail fin means 91 and the air scoop means 163 one with the other. Therefore, movement of the deflector means 89 from the normal position as shown in FIGS. 8 and 18, to the retard position as shown in FIGS. 14 and 19, is simultaneously effective in causing the air scoop means 163 to be moved from the open position thereof, as shown in FIG. 8, to the closed position 163c thereof, as shown in FIG. 10.

The mechanical linkage means 171 preferably includes a rather stiff but nonetheless flexible elongated wire-like member 173 which is slidably received within a typical sheave 175 which is fixedly attached to the plate-like member 119 in any well-known manner, i.e., as with a pair of typical clamps 177 and screw fastener means 179.

The outer end, as at 181, of the wire-like member 173 is pivotally attached to the plate-like member 161 in any conventional manner. The other end, as at 183, of the wire-like member 173 is pivotally attached to the tail fin means 91 in any well-known manner, i.e., as with swivel-eye means 185 or the like. The swivel-eye means 185 is attached to the tail fin means 91 at a predetermined position (or a calculated spaced distance from the vertical axis 95) so that counterclockwise movement (as viewed in FIG. 8) of the deflector means 89 is effective in enabling the mechanical linkage 171 to move the air-scoop means 163 to the closed position 163C, as shown in FIG. 10.

The secondary system 93b may optionally include secondary bias means 187 (as shown in FIG. 8 of the drawings) for yieldably urging the plate-like member 161 toward the open position. It will be understood by those skilled in the art that the incorporated (optional) secondary bias means 187 yieldably urges the plate-like member 161 to the position shown in FIG. 8. Therefore, the mechanical linkage means 171 may, in this instance, simply include a flexible cable, i.e., in lieu of the rather stiff wire-like member 173, the sheave 175, and the clamps 177. In other words, tension applied to the flexible cable closes the air scoop means while the secondary bias means 187 opens the air scoop means 163.

From the above disclosure it should now be appreciated that the changing wind direction acting upon the tail fin means 91 causes the deflector means 89 to pivot about the vertical axis 95 (or move within the socket 131) so that the deflector means 89 will always be properly oriented in its azimuthal datum-plate with respect to the wind direction in like manner as depicted in FIG. 8, i.e., the arrows 43 indicate the direction of the wind. Therefore, the tail fin means 91 will be aligned by the direction of the wind, always be trailing, or disposed so as to substantially bisect the rearward semicircle of the turbine 13'. In other words, a change in wind direction causes the tail fin means 91 to shift which carries the deflector means 89 along with it.

During minimal wind velocity, the deflector means 89 remains substantially as depicted in FIG. 8, i.e., in the normal position. However, as the wind velocity increases, the deflector means 89 gradually shifts counterclockwise. The tail fin means 91 has a rather large surface, thus it remains in the position shown. However, the wind acting upon the wind-flap elements 155 is effective in overpowerng the principal bias means or torsion spring 125 to achieve the relative counterclockwise movement of the deflector means 89 relative to the tail fin means 91.

More specifically, as the wind increases in velocity and a greater degree of counterclockwise movement of the deflector means 89 is achieved, the wind-flap element 155b is brought around into confronting engagement with the wind (i.e., more prependicular to the direction of the wind) which causes it to move to the extended position 155b' and the wind-flap element 155c subsequently is extended in like manner as the 90° shift of the deflector means 89 is achieved. The limit means 107, of course, prevents further shifting of the deflector means 89 with respect to the tail fin means 91.

It should also be readily understood that as the primary quadrant member 97 moves counterclockwise, as from the position shown in FIG. 8, the convex surfaces 129 of the vanes 15k, 15m and 15n are now becoming exposed to direct impingement with the wind which tends to rotate the turbine 13' in a direction opposite to the arrow 45, thus preventing excessive speed of the turbine wheel means 13.

The air-scoop means 163 is gradually closing as the deflector means 89 shifts counterclockwise which, of course, negates the effectiveness thereof in graduating degrees, i.e., also tending to cause the turbine 13' to rotate at a lower speed. In addition, as the deflector means 89 rotates counterclockwise, the secondary baffle means 159 gradually comes into play or precludes direct impingement of the wind upon the concave surfaces 127 of the forward facing vanes 15a, 15b, 15c which also tends to slow down the speed of the turbine 13'.

It may be desirable to incorporate adjustment means for the control means 93. Accordingly, certain structure well known to those skilled in the art may be included for selectively adjusting the tension on the principal bias means or torsion spring 125, and/or the tension on the mini-bias elements 157, and/or the tension of the secondary bias means 187. Such adjustment means is deemed mundane and is, therefore, not shown in the drawings but is, of course, anticipated and when desirable it may be accomplished in accordance with the latest state of the art.

Figure 20:
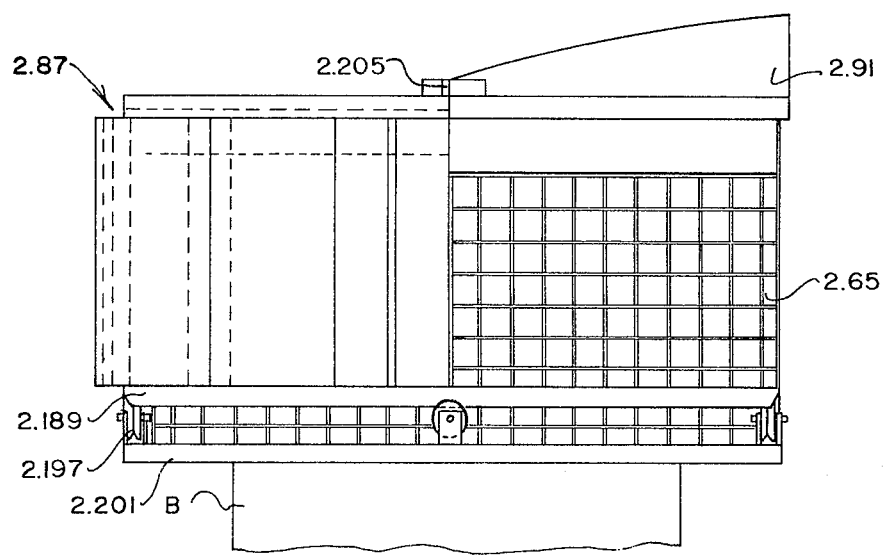
FIG. 20 is a side elevational view of a building shown with a second embodiment of the wind turbine means of the present invention mounted thereon.
Figure 21:
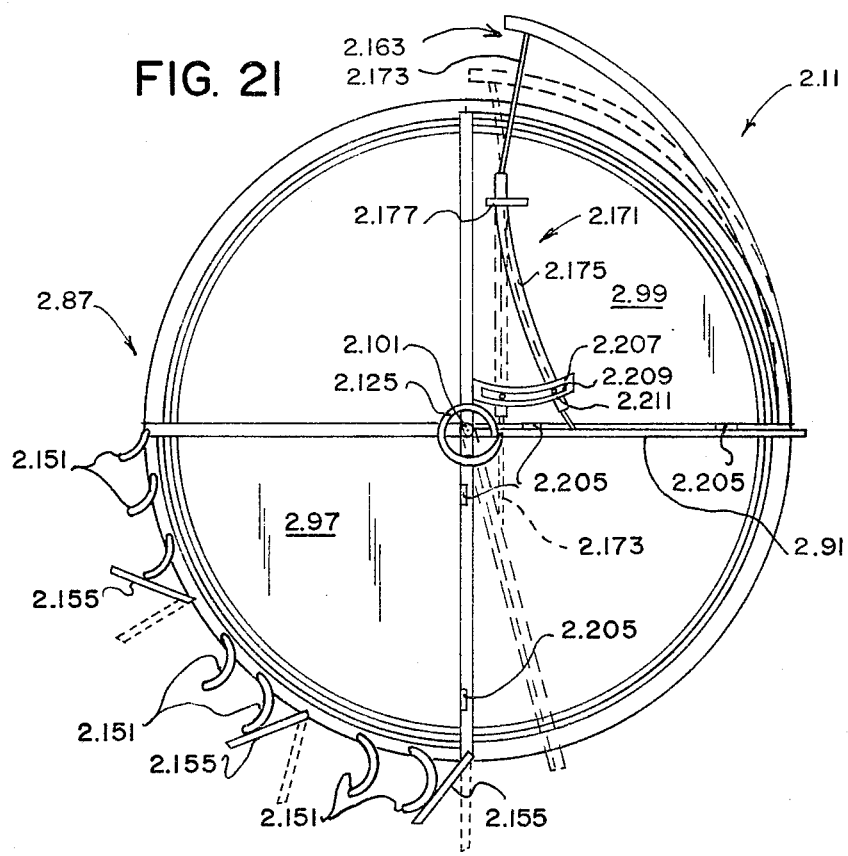
FIG. 21 is a top plan view thereof.
Figure 22:
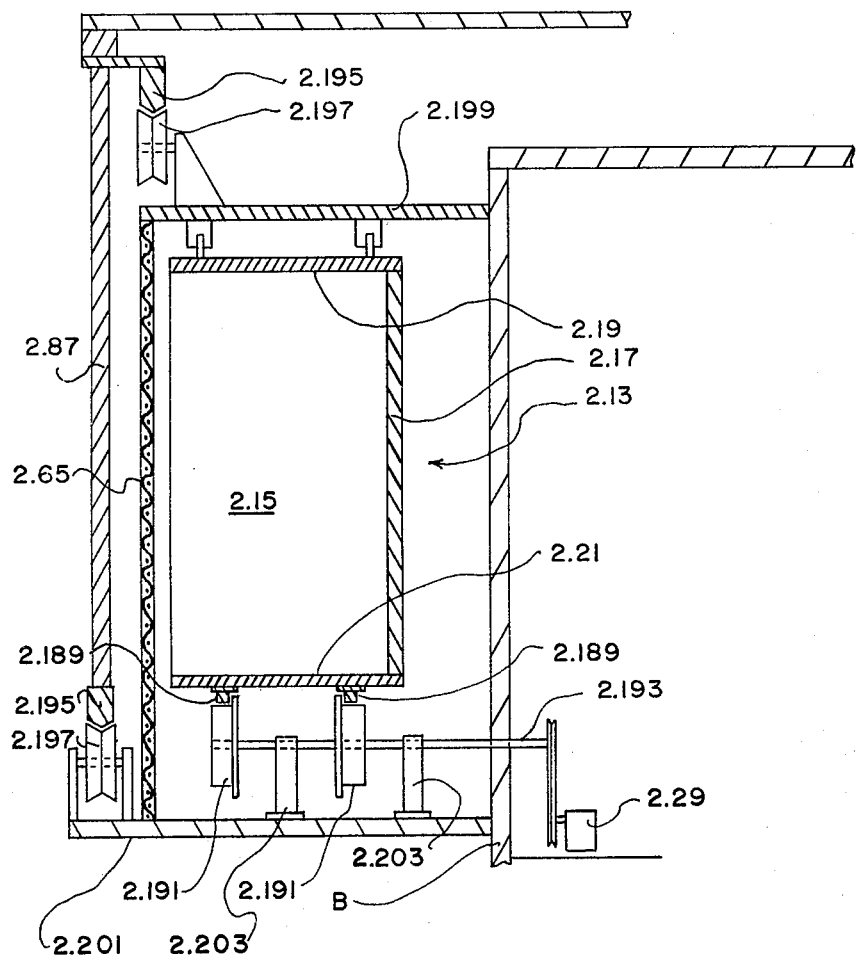
FIG. 22 is an enlarged sectional view of a portion thereof.
Figure 23:
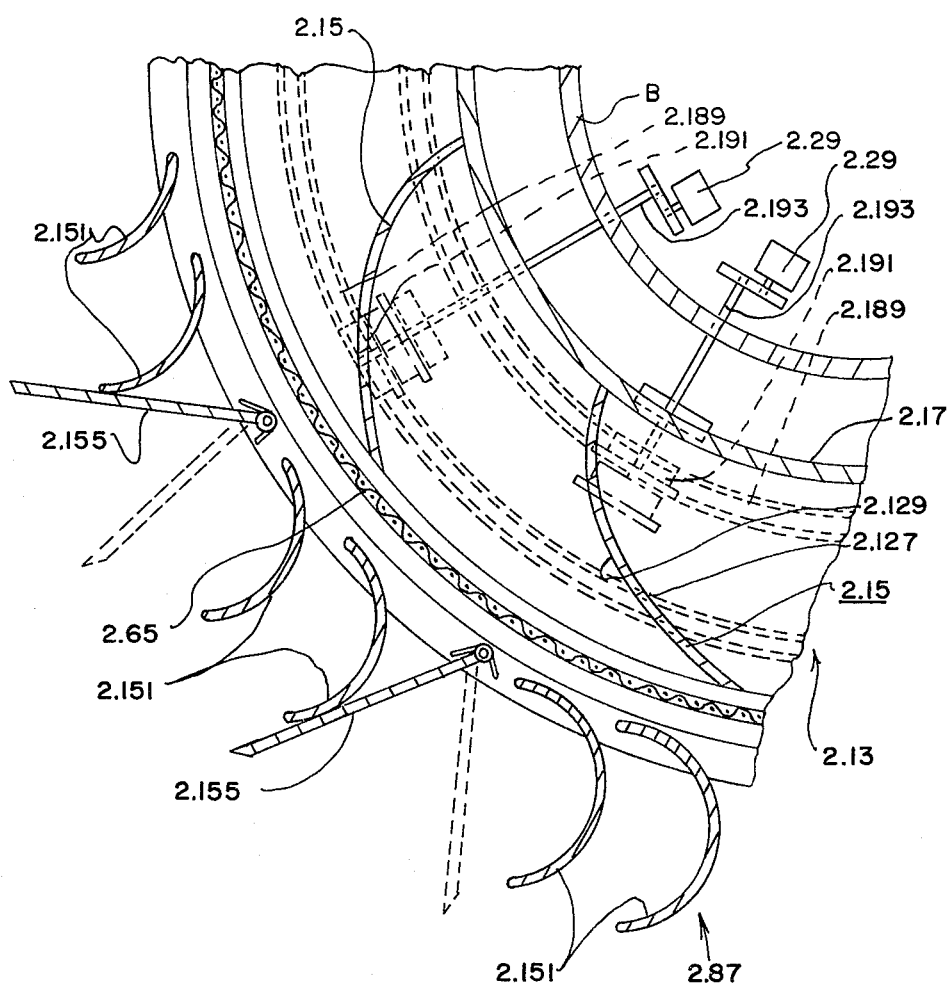
FIG. 23 is an enlarged sectional view of a portion thereof.
Figure 24:
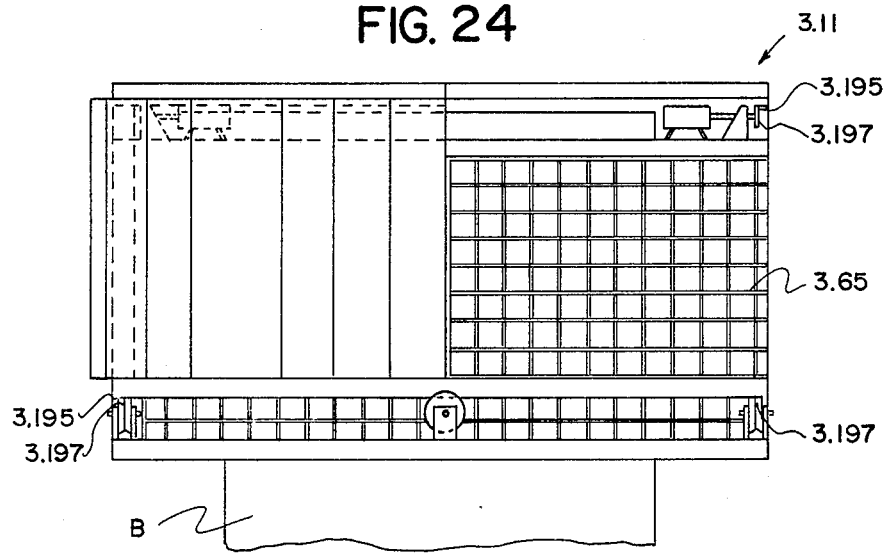
FIG. 24 is a side elevational view of a building shown with a third embodiment of the wind turbine means of the present invention mounted thereon.

A second embodiment of the wind turbine means of the present invention is shown in FIGS. 20-23 of the drawings and identified by the numeral 2.11. The wind turbine means 2.11 is shown mounted on a building B (see, in general, FIG. 20) and can be mounted on residential dwelling, specially constructed foundations or skeletal frame structures, ships, barges, multistory apartment and commercial buildings, round football and baseball stadiums, etc. It should have a diameter limited only by practicality, since it is supported by a firm foundation directly beneath the turbine wheel vanes and not by a relatively small centrally located axle or hub. Various components, elements and parts of the wind turbine means 2.11 are substantially identical to corresponding components, elements and parts of the wind turbine means 11 and will be identified by the same basic numeral heretofore used in conjunction with the description of the wind turbine means 11 with the addition of the numerical prefix "2.0" and the above description of the wind turbine means 11 should be consulted for a more detailed explanation of the construction and operation thereof. Thus, the wind turbine means 2.11 includes a turbine wheel means 2.13 defined by numerous vanes 2.15 with each vane 2.15 having a concave surface 2.127 and a convex surface 2.129 and terminating inwardly at a concentrically disposed circular wall 2.17, upwardly at an upper flange member 2.19 and downwardly at a lower flange member 2.21 (see, for example, FIGS. 22 and 23); and includes a shroud means 2.87 defined by a defector means, a tail fin means 2.91 and a control means (see, for example, FIGS. 1 and 2). A pair of endless, circular tracks or rails 2.189 are attached to the bottom of the turbine wheel means 2.13 (see FIG. 22). A plurality of wheels 2.191 for engaging the rails 2.189 are attached to shafts 2.193 which are, in turn, rotatably supported by the building B (see FIGS. 22 and 23) at strategic locations whereby the wheels 2.191 support the turbine wheel means 2.13. Likewise, a pair of endless circular tracks or rails 2.195 are attached to the shroud means 2.87. A plurality of wheels 2.197 for engaging the rails 2.195 are rotatably attached to the building B whereby the wheels 2.197 support the shroud means 2.87. The wheels 2.197 are preferably attached to the building B by way of an upper annular plate member 2.199 and a lower annular plate member 2.201 which are fixedly attached to the building B in any manner apparent to those skilled in the art and which also serve to partially enclose or house the turbine wheel means 2.13 (see, in general, FIG. 22). A screen or other hardware fabric 2.65 preferably extends between the upper and lower annular plate members 2.199, 2.201 as shown in FIG. 22 to further enclose the turbine wheel means 2.13 and prevent the vanes 2.15 from being damaged by birds and the like. Brackets 2.203 may be attached to the lower annular plate member 2.201 and to the shafts 2.193 (with the shafts 2.193 being rotatable relative to the brackets 2.203) to give added support to the wheels 2.191 and shafts 2.193 (see FIG. 22). When wind strikes the vanes 2.15, causing the turbine wheel means 2.13 to rotate, the rails 2.189 will rotate upon the wheels 2.191 thereby causing the wheels 2.191 and shafts 2.193 to rotate. The rotation of the shafts 2.193 can then be utilized in any manner such as to produce electrical energy by applying rotary motion to one or more alternators 2.29, etc., as will be apparent to those skilled in the art. Further, it should be noted that rotation of the shafts 2.193 may be utilized to rotate flywheel means (not shown) for storing energy and/or for braking the rotation of the turbine wheel means 2.13 in any manner which should now be apparent to those skilled in the art. Additionally, it should be noted that wheels 2.191 are preferably shiftably mounted relative to rails 2.189 by suitable means, as for example by utilizing a spline-type mounting of the wheels 2.191 on the shafts 2.193 so that the wheels 2.191 may be shifted to disengaged positions (shown in broken lines in FIG. 23) relative to rails 2.189 by suitable means well known to those skilled in the art, as for example, electronically, or if desired, manually, whereupon the corresponding alternators 2.29 will not be driven. Also, if desired, the wheels 2.191 may be fixed to shafts 2.193 and the shafts 2.193 shifted by suitable means, as a lever (not shown) or other means well known to those skilled in the art to disengage the wheels 2.191 from the rails 2.189. Thus, when the wind velocities are very low and there is a need to reduce friction to a minimum, a specified maximum number of the wheels 2.191 may be disengaged, as for example up to ½ of the wheels or every other one. As the speed of the turbine wheel means 2.13 increases to a point that the maximum capacity from the engaged alternators 2.29 is obtained, then the other wheels 2.191, with corresponding alternators 2.29 could be engaged, one by one, as the alternators 2.29 reach their maximum generating capacity. As each additional wheel 2.191 is engaged it would tend to slow the turbine wheel means 2.13 rotation. After all wheels 2.191 are engaged and all alternators 2.29 reach their maximum generating capacity, then the flywheels (not shown) suitably coupled to shafts 2.193 would be engaged one by one. As each flywheel reaches its maximum rpm another would engage.

The deflector means of the shroud means 2.87 is substantially identical to the deflector means 89 of the shroud means 87 of the wind turbine means 11 and includes a primary quadrant member 2.97, a secondary quadrant member 2.99, a normal position, a retard position, and infinite variable positions therebetween. The primary quadrant member 2.97 includes primary baffle means having a plurality of mini-baffle plates 2.151, etc. (see FIGS. 21 and 23). The secondary quadrant member 2.99 includes secondary baffle means defined by an air scoop means 2.163, etc. (see FIG. 21).

The tail fin means 2.91 of the shroud means 2.87 is substantially identical to the tail fin means 91 of the shroud means 87 of the wind turbine means 11 and is pivotally joined to the deflector means by pivot means 2.101, etc. The wind turbine means 2.11 also includes limit means which may be substantially identical to the limit means 107 of the wind turbine means 11. On the other hand, the limit means may merely consist of peg members 2.205 extending upwardly from the deflector means as shown in FIGS. 20 and 21 for engaging the tail fin means 2.91 to limit relative movement of the deflector means and the tail fin means 2.91 to substantially 90° as will now be apparent to those skilled in the art.

The control means of the shroud means 2.87 is substantially identical to the control means 93 of the shroud means 87 of the wind turbine means 11 and includes a primary system and a secondary system. The primary system includes a principal bias means 2.125 and a pluraity of wind-flap elements 2.155. The secondary system includes mechanical linkage 2.171 having a wire-like member 2.173 slidably received in a sheave 2.175. The outer end of the sheave 2.175 is fixedly attached to the deflector means by way of a clamp 2.177. The inner end of the sheave 2.175, rather than being fixedly attached to the deflector means as is the inner end of the sheave 175 of the wind turbine means 11, may be movably attached to the deflector means by way of a member 2.207 fixedly attached to the deflector means and having a curved slot 2.209 to which the inner end of the sheave 2.175 is slidably attached by a pivot pin 2.211 or the like (see FIG. 21) to allow the sheave 2.175 to form a gradual bend when the air-scoop means 2.163 is in an open position as shown in solid lines in FIG. 21 in a manner as should now be clear to those skilled in the art.

A third embodiment of the wind turbine means of the present invention is shown in FIGS. 24–27 of the drawings and identified by the numeral 3.11. The wind turbine means 3.11 is shown mounted on a building B and can be mounted on residential dwellings, specially constructed foundations or skeletal frame structures, ships, barges, multi-story apartment and commercial buildings, round football and baseball stadiums, etc. It could have a diameter limited only by practicality, since it is supported by a firm foundation directly beneath the turbine wheel vanes and not by a relatively small centrally located axle. It would be especially suitable for multi-story structures so that a complete unit could be a part of each floor (story). The building design would, preferably, be a cylindrical or five or more sided regular polygon. As on most multi-story buildings, there is a three or four foot, more-or-less, crawl space between each floor for water pipes, electric wire and cables, hot and cold ducts, etc. Housing for the turbine wheel could be constructed as part of the building, on the outer wall adjacent to this crawl space between each floor. Various components, elements and parts of the wind turbine means 3.11 are substantially identical to corresponding components, elements and parts of the wind turbine means 11 and the wind turbine means 2.11 and will be identified by the same basic numerals heretofore used in conjunction with the above description of the wind turbine means 11, 2.11 with the addition or substitution of the prefix "3.0" and the above description of the wind turbine means 11, 2.11 should be consulted for a more detailed explanation of the construction and operation thereof. Thus, the wind turbine means 3.11 includes a turbine wheel means 3.13 defined by numerous vanes 3.15 with each vane 3.15 having a concave surface 3.127 and a convex surface 3.129 and terminating inwardly at a concentrically disposed circular wall 3.17, upwardly at an upper flange member 3.19 and downwardly at a lower flange member 3.21 (see FIGS. 26 and 27) and includes a shroud means 3.87 defined by a deflector means and a control means. The turbine wheel means 3.13 includes rails 3.189 for coacting with wheels 3.191 which are attached to shafts 3.193 and which are supported by the building B whereby the turbine wheel means 3.13 is supported and whereby rotation of the turbine wheel means 3.13 will rotate the wheels 3.191 and shafts 3.193 whereby electrical energy can be produced by way of an alternator 3.29, etc. (see FIGS. 26 and 27). If desired, the wheels 3.191 may be shiftably mounted relative to rails 3.189 in the manner and for the purpose heretofore described relative to wheels 2.191 and rails 2.189. The shroud means 3.87 includes rails 3.195 for coacting with wheels 3.197 which are supported by upper and lower plate members 3.199, 3.201 that are attached to the building B whereby the shroud means 3.87 is supported and whereby the turbine wheel means 3.13 is partially enclosed (see, in general, FIG. 26). A screen or other hardware fabric 3.65 preferably extends between the upper and lower plate members 3.199, 3.201 to further enclose the turbine wheel means 3.13 and protect the vanes 3.15 from damage, etc. (see, in general, FIG. 26).

The deflector means of the shroud means 3.87 is substantially similar to the deflector means 89 of the wind turbine means 11 and includes a primary quadrant member 3.97, a secondary quadrant member 3.99, a normal position, a retard position, and infinite variable positions therebetween. The primary quadrant member includes primary baffle means having a plurality of mini-baffle plates 3.151, etc. (see, in general, FIG. 25). The secondary quadrant member 3.99 includes a secondary baffle means defined by an air scoop means 3.163, etc. (see, in general, FIG. 25).

The control means causes the deflector means to rotate on the wheels 3.197 in response to the wind condition at the wind turbine means 3.11. Thus, the control means includes a principal system which may consist of one or more electric motors 3.213 drivably coupled to the deflector means in any manner apparent to those persons skilled in the art for selectively causing the deflector means to rotate on the wheels 3.197, such as by being fixedly attached to one or more of the wheels 3.197 to cause the wheels 3.197 to rotate to thereby cause the rails 3.195 and the entire deflector means to rotate, in which case the wheels 3.197 may have gear teeth along its periphery and the rail 3.195 may include coacting gear teeth (see, in general, FIG. 26). The control means also causes the air scoop means 3.163 to move between its open position and its closed position in response to the wind conditions at the wind turbine means 3.11. Thus, the control means includes a secondary system which may consist of an electric motor 3.215 drivably coupled to the air scoop means 3.163 in any manner apparent to those skilled in the art such as by way of a rack-and-pinion gear means 3.217 well known to those skilled in the art for causing the air scoop means 3.163 to move between its open position and its closed position (see FIGS. 25 and 26). The pinion 3.218 of rack and pinion gear means 3.217 is mounted on the shaft (not shown) of motor 3.213 which motor is pivotally mounted by suitable means from the shroud 3.87. The rack 3.219 of rack and pinion gear means 3.217 is pivotally attached at its outer end to an upstanding extension 3.220 fixedly attached to the upper edge of air scoop means 3.163. Air scoop means 3.163 is shown in the open position. Also, rack 3.219 is shown in solid lines in the position it is in when the air scoop means is in the open position. When rack 3.219 is moved to the dotted line position shown in FIG. 26 by the action of motor 3.213, the air scoop means 3.163 will be moved to a closed position.

Figure 25:
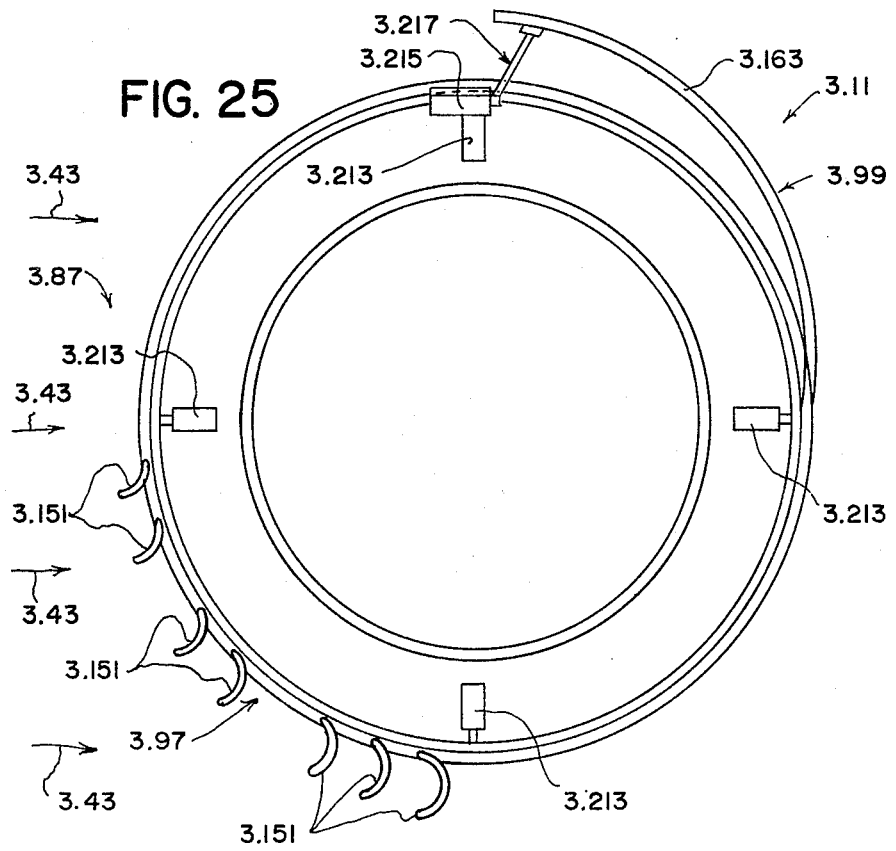
FIG. 25 is a top plan view thereof.
Figure 26:
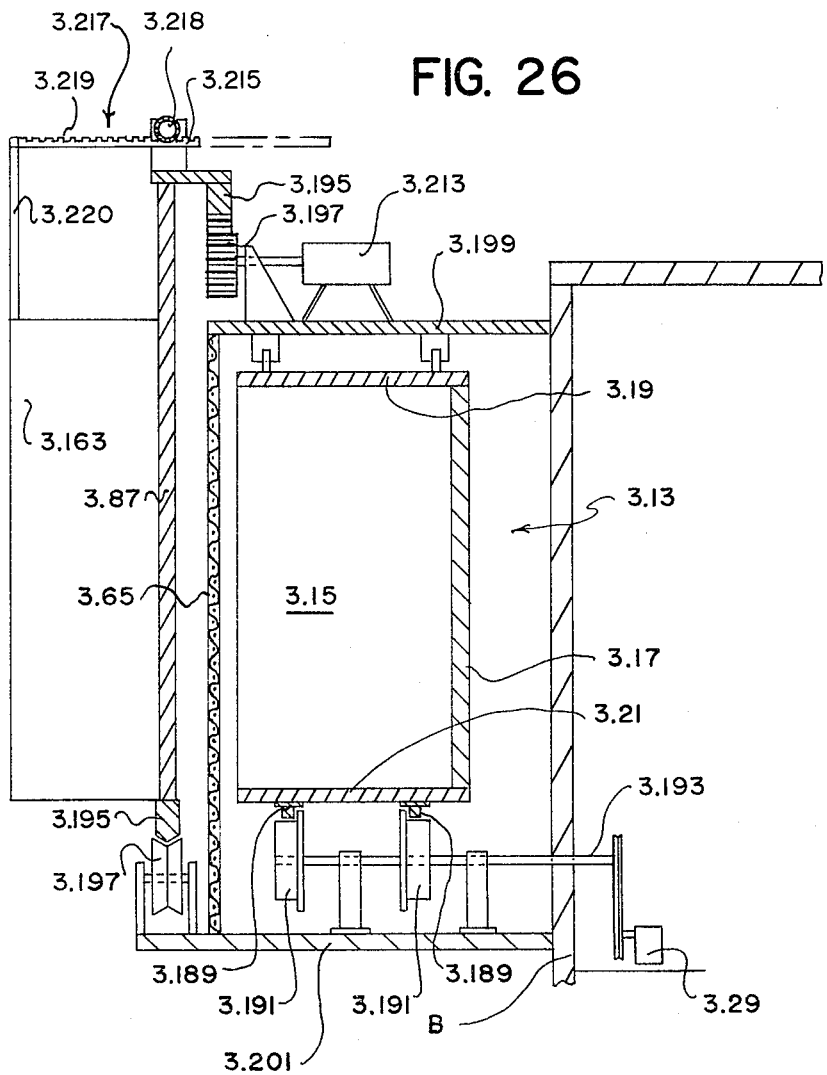
FIG. 26 is an enlarged sectional view of a portion thereof.
Figure 27:
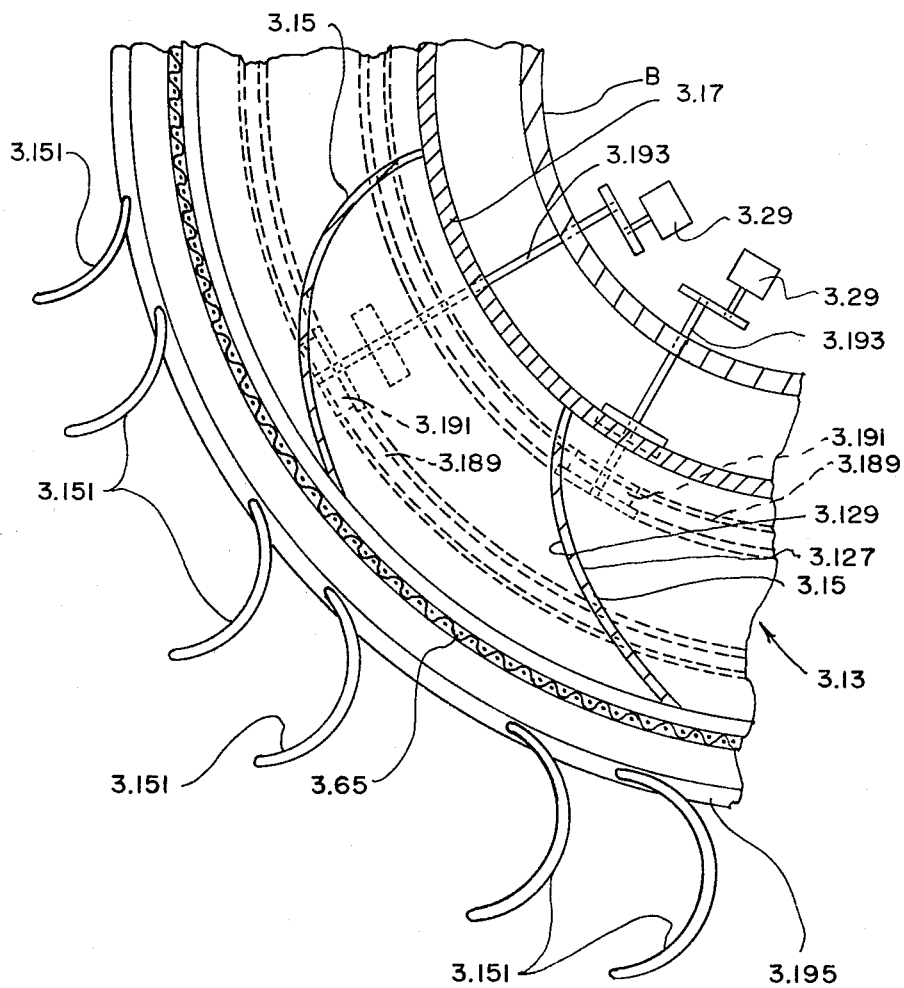
FIG. 27 is an enlarged sectional view of a portion thereof.

The electric motors 3.213, 3.215 may be manually activated to rotate the deflector means and/or open or close the air scoop means 3.163. Thus a person may monitor the wind conditions at the wind turbine means 3.11 in any manner apparent to those skilled in the art such as by way of typical and well known wind velocity and direction measuring instruments (not shown) and may physically activate the electric motors 3.213, 3.215 to properly orient the deflector means with respect to the wind direction (i.e., with the deflector means oriented substantially as shown in FIG. 25 wherein the wind direction is indicated by arrows 3.43) and to properly open or close the air scoop means 3.163 with respect to the wind velocity, etc. On the other hand, the inventor envisions that the electric motors 3.213, 3.215 may be operated automatically in response to such typical and well known wind velocity and direction measuring instruments in various manners which should now be apparent to persons skilled in the art.

Although the present invention has been described and illustrated with respect to various preferred embodiments thereof, it is to be understood that it is not to be so limited since changes and modifications may be made therein which are within the full intended scope of the invention.

I claim:

1. In wind turbine means intended to be powered by the wind and being of the type having a wind rotatable turbine wheel with the periphery thereof being defined by numerous vanes, the improvement which comprises shroud means disposed in proximity with selectable ones of the vanes for varying the effectiveness of the wind as it is acting upon said turbine wheel with the effectiveness being in infinite variable stages commensurate with the changing velocity of the wind, said turbine wheel and said shroud means being free to rotate 360° independently about their coextending vertical axes, said shroud means including deflector means for advantageously directing moving air selectively to effectively increase and decrease the speed of rotation of said turbine wheel commensurate with changing velocities of the wind, means responsive to the changing direction of the wind for properly orienting said shroud means about its vertical axis, and control means for controlling said deflector means with respect to the wind condition at said turbine means; said deflector means including at least a primary quadrant member, and the numerous vanes individually having concave and convex surfaces and being disposed in a uniform array to rotatably drive the turbine wheel in a forward direction as the wind impinges the concave surfaces and to tend to drive the turbine wheel in a reverse direction as the wind impinges the convex surfaces; said deflector means having a normal position which corresponds to minimal wind velocity conditions, a retard position which corresponds to strong wind velocity conditions, and infinite variable positions therebetween; said primary quadrant member includes primary baffler means for precluding direct impingement of the wind with the convex surfaces of those individual vanes which occupy the forward facing semi-circle of the turbine wheel when said deflector means is in said normal position; said control means being adapted to cause said deflector means to move toward the retard position thereof.

2. The wind turbine as set forth in claim 1 in which said control means includes a principal system having a principal bias means for yieldably biasing said deflector means towards said normal position thereof, a plurality of progressively operable wind-flap elements pivotally attached to said primary quadrant member for pivotal movement about their respective vertical axes with said wind-flap elements having independently operable retracted and extended positions, and a like number of mini-bias elements respectively attached to said wind-flap elements for yieldable biasing said wind-flap elements toward the respective retracted positions thereof; said wind-flap elements being progressively moved to their respective extended position as the velocity of the wind increases with said extended wind-flap elements being effective by reacting with the increasing wind velocity, in causing said deflector means to move toward the retard position thereof by overpowering said principal bias means.

3. The wind turbine as set forth in claim 1 in which said control means includes a principal system having electric motor means drivably coupled to said deflector means for causing said deflector means to move toward the retard position thereof.

4. The wind turbine as forth in claims 2 or 3 in which said deflector means includes a secondary quadrant member which is integrally attached to said primary quadrant member, said primary and secondary quadrant members being diagonally disposed one from the other and converging at said coextending vertical axis, said secondary quadrant member having air scoop means for scooping and directing the wind inwardly toward a portion of the rearward semicircle of the turbine wheel when said deflector means is in said normal position thus causing the wind to advantageously impinge the concave surfaces of those individual vanes which occupy at least a portion of the rearward semicircle of the turbine wheel.

5. The wind turbine as set forth in claim 4 in which is included air scoop pivot means for pivotally attaching at least a portion of said air scoop means to said shroud means with said air scoop means being pivotally movable between open and closed positions and infinite variable positions therebetween.

6. The wind turbine as set forth in claim 5, in which said control means includes a secondary system for simultaneously controlling the pivotal movement of said air scoop means between said open and closed position as said deflector means is caused to move between said normal and retard positions.

7. The wind turbine as set forth in claim 6 in which said means responsive to the changing direction of the wind for properly orienting said shroud means about its vertical axis includes a tail fin means, and in which said secondary system includes mechanical linkage means for interconnecting said tail fin means and said air scoop means one with the other with movement of said deflector means from said normal position to said retard position simultaneously being effective in causing said air scoop means to be moved from said open position to said closed position.

8. The wind turbine as set forth in claim 7 in which said mechanical linkage includes a sheave having an outer end and an inner end, and a flexible member slidably received in said sheave and having an inner end attached to said tail fin means and an outer end attached to said air scoop means; said outer end of said sheave being fixedly attached to said deflector means, said inner end of said sheave being movably attached to said deflector means.

9. The wind turbine as set forth in claim 6 in which said secondary system includes electric motor means drivably coupled to said air scoop means for causing said air scoop means to move between said open position and said closed position.

10. The wind turbine as set forth in claim 7 in which said secondary system includes secondary bias means for yieldably urging at least a portion of said air scoop means toward said open position.

11. The wind turbine set forth in claim 1 in which said wind turbine is mounted on a building; in which said turbine wheel includes endless, circular rail means for rotation therewith; in which a plurality of wheel means are attached to said building for coacting with said rail means of said turbine wheel and for supporting said turbine wheel, rotation of said turbine wheel causing said wheel means to rotate to thereby produce rotary motion; in which said shroud means includes endless, circular rail means for rotation therewith; and in which a plurality of wheel means are attached to said building for coacting with said rail means of said shroud means and for supporting said shroud means.

12. In wind turbine means intended to be powered by the wind for generating electrical energy and being of the type having a wind rotatable turbine wheel with the periphery thereof being defined by numerous vanes, the improvement which comprises shroud means disposed in proximity with selectable ones of the vanes for varying the effectiveness of the wind as it is acting upon said turbine wheel with the effectiveness being in infinite variable stages commensurate with the changing velocity of the wind, said turbine wheel and said shroud means being free to rotate 360° independently about their coextending vertical axes, said shroud means including deflector means for advantageously directing moving air selectively to effectively increase and decrease the speed of rotation of said turbine wheel commensurate with changing velocities of the wind, tail fin means responsive to the changing direction of the wind for properly orienting said shroud means about its vertical axis, and control means for sensing changes in wind velocity and effectively controlling said deflector means with said deflector means being operatively responsive to said control means; said deflector means including at least a primary quadrant member, and the numerous vanes individually having concave and convex surfaces and being disposed in a uniform array to rotatably drive the turbine wheel in a forward direction as the wind impinges the concave surfaces and to tend to drive the turbine wheel in a reverse direction as the wind impinges the convex surfaces; said deflector means having a normal position which corresponds to minimal wind velocity conditions, a retard position which corresponds to strong wind velocity conditions, and infinite variable positions therebetween; said primary quadrant member includes primary baffler means for precluding direct impingement of the wind with the convex surfaces of those individual vanes which occupy the forward facing semicircle of the turbine wheel when said deflector means is in said normal position; said control means comprising at least a principal system including principal bias means for yieldably biasing said deflector means toward said normal position thereof, a plurality of progressively operable wind-flap elements pivotally attached to said primary quadrant member for pivotal movement about their respective vertical axes with said wind-flap elements having independently operable retracted and extended positions, and a like number of mini-bias elements respectively attached to said wind-flap elements for yieldably biasing said windflap elements toward the respective retracted positions thereof; said wind-flap elements being progressively moved to their respective extended position as the velocity of the wind increases with said extended windflap elements being effective, by reacting with the increasing wind velocity, in causing said deflector means to move toward the retard position thereof by overpowering said principal bias means.

13. The wind turbine as set forth in claim 12 in which said deflector means includes a secondary quadrant member which is integrally attached to said primary quadrant member, said primary and secondary quadrant members being diagonally disposed one from the other and converging at said coextending vertical axis, said secondary quadrant member includes secondary baffle means for shielding at least a portion of the cancave surfaces of those individual vanes which occupy the forward facing semicircle of the turbine wheel when said deflector means is moved toward said retard position.

14. The wind turbine as set forth in claim 12 in which said deflector means includes a secondary quadrant member which is integrally attached to said primary quadrant member, said primary and secondary quadrant members being diagonally disposed one from the other and converging at said coextending vertical axis, said secondary quadrant member having air scoop means for scooping and directing the wind inwardly toward a portion of the rearward semicircle of the turbine wheel when said deflector means is in said normal position thus causing the wind to advantageously impinge the concave surfaces of those individual vanes which occupy at least a portion of the rearward semicircle of the turbine wheel.

15. The wind turbine as set forth in claim 14 in which is included air scoop pivot means for pivotally attaching at least a portion of said air scoop means to said shroud means with said air scoop means being pivotally movable between open and closed positions and infinite variable positions therebetween.

16. The wind turbine set forth in claim 15 in which said control means includes a secondary system for simultaneously controlling the pivotal movement of said air scoop means between said open and closed position as said deflector means is caused to move between said normal and retard positions.

17. The wind turbine as set forth in claim 16 in which said secondary system includes mechanical linkage means for interconnecting said tail fin means and said air scoop means one with the other with movement of said deflector means from said normal position to said retard position simultaneously being effective in causing said air scoop means to be moved from said open position to said closed position.

18. The wind turbine set forth in claim 16 in which said secondary system includes secondary bias means for yieldably urging at least a portion of said air scoop means toward said open position.

19. The wind turbine as set forth in claim 12 in which said deflector means includes an integrally attached secondary quadrant member diagonally disposed from said primary quadrant member, and in which said control means includes a secondary system for controlling certain structure peculiar to said secondary quadrant member.

20. The wind turbine means set forth in claim 11 which includes a plurality of alternator means, means shiftably coupling said wheel means attached to said building respectively with said alternator means including means for shifting said wheel means into and out engagement with said circular rail means for selectively driving and disengaging the drive of said alternator means.

* * * * *